Patented July 23, 1946

2,404,519

UNITED STATES PATENT OFFICE 2,404,519

METHOD OF MAKING AQUEOUS DISPERSIONS CONTAINING POLYVINYL ACETATE AND WAX

George Osman Morrison and Henry Michael Collins, Shawinigan Falls, Quebec, Canada, assignors to Shawinigan Chemicals Limited, Montreal, Quebec, Canada, a corporation of Canada No Drawing. Application May 15, 1943, Serial No. 487,186. In Canada November 4, 1942

3 Claims. (Cl. 260—28)

INTRODUCTION

This invention relates to emulsions of polyvinyl acetate and to protective films and coatings formed therefrom.

Polyvinyl acetate is particularly useful for coating purposes in view of its excellent film-forming properties, freedom from brittleness, good colour and inertness to chemical influences. It is also tough and flexible and has many other useful characteristics. Its specific properties may be readily varied to suit particular uses. However, the use of aqueous emulsions of polyvinyl acetate for forming moisture-proof coatings has been somewhat limited because of the sensitivity of these coatings to re-emulsification and consequent disintegration.

OBJECTS

It is a principal object of the present invention to provide new compositions of matter including polyvinyl acetate emulsions which are suitable for use in the preparation of waterproof sheets or films, or useful for forming waterproof coatings on various materials. It is a further object of the invention to provide a composition embodying, in emulsion form, polyvinyl acetate as a film-forming constituent, and a moisture-proofing agent with or without other modifying constituents such as for instance, softeners and plasticizers. Further objects are to provide improved methods of making these compositions, improved methods of moisture-proof coating, improved coatings and improved coated articles.

THE INVENTION

These objects and others are accomplished according to the invention by a composition which includes an aqueous emulsion of polyvinyl acetate as a principal film-forming constituent, an oleaginous or waxy protective agent, the composition being capable of forming a film having moisture-proof characteristics. This film may be laid down by ordinary methods of coating, but preferred results are achieved by flashing the film, that is, by subjecting it to a blast of hot air at a temperature above the melting point of the waxy agent. This causes the formation of a bloom which protects the film from re-emulsification or from otherwise disintegrating.

Articles made from materials which are not resistant to water and coated in this manner may be rendered completely moisture-proof. This is particularly advantageous in the case of containers for aqueous materials.

EXAMPLES

To illustrate the invention in more detail, several examples will be given of specific embodiments. These data are intended in an illustrative and not in a restricting sense.

Example I

This example demonstrates a preferred method of manufacturing a polyvinyl acetate emulsion according to the invention.

In one procedure the following constituents were employed at the approximate concentration set out:

| | |
|---|---|
| Water _____grams__ | 800 |
| Vinyl acetate _____do____ | 900 |
| Emulsifier—gum tragacanth_____per cent__ | [1] 25 |
| Partially hydrolyzed polyvinyl acetate having a polyvinyl acetate content of about 31% made from polyvinyl acetate having a viscosity of about 7 centipoises _____per cent__ | [1] 5 |
| "Aerosol O. T." (the sodium salt of the sulphonic acid of dioctyl succinic ester)____ per cent__ | [1] 1 |
| Paraffin wax, melting point 135° F_____do____ | [1] 20 |
| Catalyst—benzoyl peroxide_____grams__ | .69 |

[1] By weight of the total charge.

An aqueous solution of the emulsifier was charged into a kettle equipped with a reflux condenser and stirring blades. One type of equipment, as used according to the following conditions, includes an aluminum pot about 8 inches high by about 6 inches outside diameter having a concave bottom and no baffles. The stirrer shaft is of stainless steel. It embodies half an inch from the bottom 4 blades in a cluster 1 inch by ½ inch bent at 45° for downward thrust; four inches from the bottom, a pair of blades (one at each side of the shaft) each 2½ inches by ¾ inch bent at an angle of 45° for downward thrust. The useful speeds of the blades are about 500 to about 1800 revolutions per minute.

Stirring was started. The catalyst and water were added. Two minutes, stirring at about 1200 revolutions per minute was allowed and then the monomeric vinyl acetate was added slowly. The whole charge was then agitated for about 5 minutes in the cold to complete emulsification of the monomer. Stirring was continued at about the same speed and the temperature of the jacket raised to about 70° C. and maintained at this temperature until the temperature of the charge reached about 66° C.

Then, as the reaction gathered momentum and reflux commenced, the temperature of the jacket was gradually and suitably reduced in order to maintain a moderate reflux of about 1 percent to about 1½ percent of the total charge per hour. Finally, the jacket temperature was reduced in order to regulate the reflux at the low rate. When the temperature of the charge had reached about 70° C. the temperature of the jacket was gradually raised from its minimum to about 82° C. Thus, as the temperature of the charge increased, the reflux slowed up and the temperature of the charge followed closely behind that of the jacket. When they were equal at about 82° C. reflux ceased and polymerization of the monomer was substantially complete.

The wax was then added and the emulsion stirred for about 10 minutes with the temperature maintained at about 82° C. The charge was then cooled down to about 25° C. This was done over a period of about one hour with stirring continued. The agitator was then stopped and the batch of finished emulsion discharged. The resulting composition had substantially the following characteristics:

Viscosity of emulsion at 20° C__centipoises__ 300
Total solids_____per cent__ [1]61
Residual vinyl acetate_____do____ [1].9
Polyvinyl acetate viscosity___centipoises____ 30
Stability_____ Good

[1] On total charge.

Example 2

This example demonstrates the respective characteristics of "unflashed" and "flashed" films laid down from a composition made according to Example 1.

A film was cast from this emulsion by "slosh" coating at about 20° C. on the inside surface of two containers A and B. These containers were made from fine cardboard of the type usually employed for making liquid containers. The film coating the surface of container A was dried at about 20° C.

The film was about 1 mil in thickness. It was pliable and elastic. Water at about 30° C. was poured into this container. After about 72 hours at room temperature the container was practically soaked through and had collapsed. The film had almost completely re-emulsified.

The coating on container B was dried at about 20° C. It was then "flashed" for about three minutes in an air oven with a blast of air heated to about 110° C. The film was about 1 mil in thickness. It was pliable and elastic. A bloom of wax had formed on the surface. Water at about 30° C. was poured into this container. After about two weeks at room temperature the film on the container was still intact. No re-emulsification of the film could be detected. Containers coated similarly to B were acceptable to the trade for containing aqueous materials.

Example 3

The following example demonstrates the characteristics of a film prepared from a polyvinyl acetate emulsion containing no wax but subsequently coated with wax.

An emulsion was prepared substantially as in Example 1 with the exception that no wax was incorporated. A film was cast on the inside of two fine cardboard containers C and D substantially as in Example 2, at a temperature of about 20° C.

A thin film of wax was "slosh" coated over the dried polyvinyl acetate film of container C at about 90° C. Where there was no plasticizer present in the polyvinyl acetate, the resultant film was brittle. The composite film was made up of about 1½ mil polyvinyl acetate and about ½ mil wax.

The container was filled with water which was kept at about 30° C. After about two weeks the container and film were intact, but creasing of the cardboard resulted in extensive leakage. There was no re-emulsification.

The film on container D was allowed to dry at about 20° C. Re-emulsification of the film began after about 1 hour's contact with the water and the container collapsed after about 10 hours' contact with the water.

Example 4

An emulsion was prepared as in Example 1 with the exception that the waxy agent was increased to about 60% of the polyvinyl acetate.

A film was laid down on cardboard containers as in Examples 1 and 2. This film was not flashed and the containers were subjected to the same tests as in Examples 1 and 2 to determine their ability to withstand water. The results were similar to those obtained with the flashed films of Examples 1 and 2, with the exception that the films of this example were more elastic.

Example 5

The procedure of Example 1 was repeated with hydrogenated cotton seed oil replacing about 25% of the paraffin wax, the oil serving as a plasticizer for the wax. From the resulting emulsion a film was formed on the surface of the container. The film was flashed and cooled and tests for moisture-proof characteristics were carried out substantially as in Example 2. The film had the same excellent moisture-proof characteristics as container B (Ex. 1) and was at the same time more pliable and more capable of being creased without injury to the film.

Examples 6–15

In order to demonstrate the manufacture and use of different films formed according to the invention, the following Examples 6 to 15 are given. According to the natures and approximate concentrations of the constituents set out in the table, emulsions were made substantially in accordance with Example 1. Containers were coated with these emulsions and tested for performance substantially as in Example 2, and the performance of the coatings was as indicated in the table.

Table I

| Ex. | Plasticizer | Wax plasticizer | Pliability | Wax: Percent of total charge | Approximate moisture proof stability of film |
|---|---|---|---|---|---|
| | | | | | Per cent |
| 6 * | | Nil | Brittle | 15% | 30 |
| 7 | | Petroleum jelly, 15% | Good | 7% | 70 |
| 8 | | Petroleum jelly, 20% | do | 5% | 70 |
| 9 | 3% "3G. H." | Petroleum oil, 12% | Excellent | 8% | 90 |
| 10 | | | Brittle | 15% | 100 |
| 11 | | | do | ½ mil overcoat | 100 |
| 12 | | Hydrogenated cotton seed oil, 15%. | Good | 10% | 100 |
| 13 | | Petroleum jelly, 15% | do | 18% | 100 |
| 14 | 5% M. 17 | Nil | Very pliable | 18% | 100 |
| 15 | 5% B. 16 | do | do | 18% | 100 |

* The coating of Example 6 was not flashed, whereas those of Examples 7 to 15 were flashed.

"3 G. H." is triethylene glycol di-hexoate, M. 17 is methyl phthalyl ethyl glycolate and B. 16 is butyl phthalyl butyl glycolate.

Example 16

The emulsion was made as in Example 1 with the exception that the wax was added to the charge before the start of the reaction.

The emulsion was used for coating containers in procedures similar to those of Example 2. The results as regards the characteristics of the films and their moisture-proof performance were substantially the same as those of Example 2.

DETAILED DESCRIPTION

While the examples demonstrate various specific types of coating-emulsions according to the invention, it will be obvious to one skilled in the art that the particular constituents, compositions, conditions and concentrations set out may be varied widely within the scope of the invention.

PROTECTIVE AGENT

For instance, the nature of the protective agent may be varied. Suitable agents are oleaginous or waxy materials such as for instance; hydrogenated natural oils and fats, for example, cotton seed oil, linseed oil; saturated natural oils, for instance, animal oils, sperm oils; paraffin type oils and waxes, for example, micro-crystalline paraffin wax and paraffin oil; or mixtures of these substances. These agents or mixtures thereof should have a melting point of between about 47° F. and about 140° F. and the necessary flexibility when solid and other coating characteristics as will be understood by those skilled in the art. The melting point will vary depending upon the particular use to which the coating is put. It is preferable that the melting point be between about 100° F. and about 140° F. Preferred agents are paraffin waxes.

The useful range of concentration of the protective agent is between about 12% and about 40% calculated by weight on the total charge. The preferred range of concentration is between about 12% and about 20%.

MODIFYING AGENTS

The coating emulsion is preferably modified to make the resulting film more flexible and to render it more flowable than it would be with wax alone as a protective agent. This may be effected by adding a softener for the wax and/or a plasticizer for the resin. An effective softener is hydrogenated cotton seed oil, conveniently the commercial product known as "Crisco," employed at concentrations of between about 3% and about 15% of the total charge. Other oleaginous softeners such as for instance petroleum jelly, may be employed at similar concentrations.

To improve the properties of the films still further, a plasticizer for the resin may be employed in conjunction with the softener. This plasticizer must be non-toxic and capable of acting to plasticize the resin at a concentration insufficient to contaminate the coating with odour or taste-giving properties. Suitable plasticizers of this type are butyl phthalyl butyl glycolate and methyl phthalyl ethyl glycolate. The plasticizers are preferably used at concentrations of between about 3% and about 5% by weight of the total charge. When the coating is flashed according to the present invention, the wax bloom has the effect of isolating the contents of the container from the plasticizer. Thus the concentration of the plasticizer may be increased over what might otherwise be thought possible without danger of contaminating the contents.

MANUFACTURING PROCEDURE

While substantially conventional methods are employed in making the emulsion, in order to improve still further the qualities of the emulsion as a coating material, special steps are taken in the process of manufacture. Up to the completion of polymerization the procedure is conventional for the manufacture of polyvinyl acetate emulsions, with the exception that the waxy agent is added as an additional phase either prior to, during, or after polymerization. The procedure then departs from the conventional in that the wax-containing emulsion is cooled very slowly, i. e. over a period of about 40 minutes to about 2 hours or more, from the upper temperature resulting from polymerization of about 84° C. to room temperature of about 20° C. By following this procedure, emulsions can be made having viscosities of between about 200 and about 2000 centipoises. Those in the neighborhood of 300 centipoises are preferred. These emulsions flow readily, thus having excellent characteristics for coating. In contrast, similar emulsions which were cooled rapidly, exhibited viscosities of as high as 7,000 centipoises. The latter emulsions were not stable and films laid down from them were poorly flexible. From this, it would appear that slow cooling causes the formation of small discrete wax particles as a third phase of the emulsion. In most cases, these wax particles were of a size between about $4\mu$ and about $20\mu$.

In general, the normal constituents of the emulsions, e. g. emulsifying agents, catalysts, modifying agents, etc. may be those generally employable in the manufacture of aqueous emulsions of polyvinyl acetate. Preferred types of emulsions may, however, be manufactured by following the teachings of the present application in conjunction with those of the following copending applications, H. M. Collins, S. N. 457,337, Sept. 4, 1942, relating to the use of emulsifying agents of particular types, and M. Kiar, S. N. 457,339, Sept. 4, 1942, relating to the use of particular conditions to influence the characteristics of the resulting polymer.

COATING

The formation of the film or coating on the surface of the article being coated may be effected in a conventional manner. In order, however, to achieve the preferred results of which the present invention is capable using a relatively thin coating, the dried coating is flashed at a temperature above the melting point of the waxy protective agent. This apparently has the effect of bringing the wax to the surface to form a "bloom" which acts to prevent penetration by moisture.

The thickness of the films formed may vary considerably. Satisfactory moisture-proof films for commercial purposes are in the neighborhood of 1 mil in thickness.

The films may also be modified by treatment with the pigments or fillers usually employed with polyvinyl acetate resins. Food products and other articles can be coated directly with films as opposed to coating a container. Self-sustaining films can also be formed and rendered waterproof by the present teachings.

Uses

These coatings have a wide variety of uses. A principal utility lies in rendering water-permeable materials waterproof. This is of particular advantage for the manufacture of cardboard containers for aqueous materials, particularly foods and beverages, such as milk, honey, fruit juices, etc. Other materials may also be coated such as leather, fabrics, cellulosic materials such as for instance, paper of various types. Many other uses will also be apparent to those skilled in the art.

In this specification, the term "waterproof coating" is intended to indicate a coating able to withstand water effectively for the purposes to which the coated material is to be put. For instance, containers for aqueous liquids must be sufficiently water-proof that the container will, under the conditions of manufacture, handling and use, stand up to the satisfaction of the trade and of consumers.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

We claim:

1. A process of preparing a coating composition comprising adding a wax to an aqueous dispersion of polyvinyl acetate produced by emulsion polymerization, in the presence of an emulsifying agent effective to stabilize said dispersion, said polyvinyl acetate being present in an amount ranging from about 30 to about 70% of the said dispersion, said wax being present in an amount ranging from about 12 to about 40% of the total composition, the wax being added when the dispersion has a temperature above the melting point of the wax, then cooling the dispersion slowly with stirring to about room temperature during a period of about 40 minutes to 2 hours whereby the wax constitutes a phase of said dispersion in small discrete particles.

2. A process according to claim 1 wherein the wax is a paraffin wax having a melting point within a range from about 47° F. to about 140° F.

3. A process according to claim 1 wherein there is added to the dispersion an oleaginous softener for the wax and a plasticizer for the polyvinyl acetate.

GEORGE OSMAN MORRISON.
HENRY MICHAEL COLLINS.